(12) United States Patent
Yoo et al.

(10) Patent No.: US 8,343,597 B2
(45) Date of Patent: *Jan. 1, 2013

(54) NORBORNENE POLYMER COMPRISING PHOTOREACTIVE FUNCTIONAL GROUP HAVING HALOGEN SUBSTITUENT GROUP, PROCESS FOR PREPARING THE SAME, AND ALIGNMENT LAYER USING THE SAME

(75) Inventors: Dong-Woo Yoo, Daejeon Metropolitan (KR); Sung-Ho Chun, Daejeon Metropolitan (KR); Dai-Seung Choi, Daejeon Metropolitan (KR); Young-Chul Won, Daejeon Metropolitan (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/123,444

(22) PCT Filed: Jan. 12, 2010

(86) PCT No.: PCT/KR2010/000171
§ 371 (c)(1),
(2), (4) Date: May 16, 2011

(87) PCT Pub. No.: WO2010/080010
PCT Pub. Date: Jul. 15, 2010

(65) Prior Publication Data
US 2011/0213048 A1 Sep. 1, 2011

(30) Foreign Application Priority Data

Jan. 12, 2009 (KR) .................. 10-2009-0002316
Jan. 12, 2010 (KR) .................. 10-2010-0002496

(51) Int. Cl.
*C08K 19/00* (2006.01)
*C08F 2/50* (2006.01)
*C08F 4/80* (2006.01)
*C08F 110/14* (2006.01)
*C08F 210/14* (2006.01)

(52) U.S. Cl. .......... 428/1.2; 428/1.1; 522/121; 522/117; 526/171; 526/242; 526/282

(58) Field of Classification Search .................. 522/121, 522/79, 117; 526/90, 108, 131, 134, 139, 526/160, 161, 171, 242, 308, 286, 282; 428/1.1, 428/1.2
See application file for complete search history.

(56) References Cited

U.S. PATENT DOCUMENTS 6,677,175 B2 * 1/2004 Zhao et al. .................. 438/31
(Continued)

FOREIGN PATENT DOCUMENTS
CN 1989226 A 6/2007
(Continued)

OTHER PUBLICATIONS

Chemical Abstracts Service, Columbus, Ohio, US; May 19, 2009, Yoo, Dong U. et al.: "Photopolymerization rate-controllable norbornene monomers", XP002679647.

*Primary Examiner* — Susan W Berman
(74) *Attorney, Agent, or Firm* — McKenna Long & Aldridge LLP (57) ABSTRACT

The present invention relates to a photoreactive norbornene polymer comprising a photoreactive norbornene monomer, a process for preparing the same, and an alignment layer using the same. The photoreactive norbornene polymer includes a photoreactive functional group having a halogen, in particular, a fluorine substituent group so that it gives a compositional gradient in the alignment layer to improve an orientation rate, an orientation, and an adhesion property.

11 Claims, 3 Drawing Sheets

U.S. PATENT DOCUMENTS

| | | | |
|---|---|---|---|
| 6,844,403 B2 * | 1/2005 | Oshima et al. | 526/171 |
| 7,541,073 B2 * | 6/2009 | Kim et al. | 428/1.2 |
| 7,550,546 B2 * | 6/2009 | Watanabe et al. | 526/281 |
| 7,795,361 B2 * | 9/2010 | Kim et al. | 526/282 |
| 2006/0159865 A1 | 7/2006 | Kim et al. | |
| 2006/0160970 A1 | 7/2006 | Kim et al. | |
| 2009/0198037 A1 * | 8/2009 | Watanabe | 528/271 |
| 2010/0068419 A1 | 3/2010 | Kim et al. | |
| 2010/0182547 A1 | 7/2010 | Ryu et al. | |
| 2011/0051050 A1 | 3/2011 | Shin et al. | |
| 2011/0213048 A1 | 9/2011 | Yoo et al. | |

FOREIGN PATENT DOCUMENTS

| | | |
|---|---|---|
| CN | 101098840 A | 1/2008 |
| JP | 2006-348115 A | 12/2006 |
| KR | 10-2006-0080552 A2 | 7/2006 |
| KR | 10-0671753 B1 | 1/2007 |
| KR | 10-2008-0095207 A | 10/2008 |
| KR | 10-2009-047720 | 5/2009 |
| WO | WO 2009/091224 A2 | 7/2009 |
| WO | WO 2009/091227 A2 | 7/2009 |

* cited by examiner

FIG.4 substrate 1: COC film, binder: pentaerythritol triacrylate substrate 2: COC film, binder: dipentaerythritol hexaacrylate substrate 3: COP film, binder: pentaerythritol triacrylate

NORBORNENE POLYMER COMPRISING PHOTOREACTIVE FUNCTIONAL GROUP HAVING HALOGEN SUBSTITUENT GROUP, PROCESS FOR PREPARING THE SAME, AND ALIGNMENT LAYER USING THE SAME

TECHNICAL FIELD

This application is a national stage application of PCT/KR2010/000171, filed on Jan. 12, 2010, which claims priority to Korean Patent Application Nos. 10-2009-0002316 filed on Jan. 12, 2009 and 10-2010-0002496 filed on Jan. 12, 2010. The present invention relates to a photoreactive norbornene polymer comprising a photoreactive norbornene monomer, a process for preparing the same, and an alignment layer using the same and, more specifically, to a photoreactive norbornene polymer comprising a photoreactive norbornene monomer which has excellent adhesion property and can make an improvement in an orientation and an orientation rate of liquid crystals, a process for preparing the same, and an alignment layer using the same.

BACKGROUND OF ART

Recently, with getting larger and larger, liquid crystal displays (LCDs) are broadening their applications from personal use such as cell phones or laptops to home use such as wall mountable television sets, and in accordance with this trend, high definition, high fidelity and a wide viewing angle are required for the LCDs. In particular, since individual pixels operate independently, thin film transistor-liquid crystal displays (TFT-LCD) driven by a thin film transistor exhibit a very fast response speed of liquid crystals, and thereby make it possible to realize a high definition dynamic image and are gradually expanding boundaries of their application.

In order to be utilized as an optic switch in TFT-LCDs, liquid crystals should be initially oriented in a certain direction on a TFT layer which is disposed in the innermost part of a display cell, and a liquid crystal alignment layer is used to this end.

A current method of orienting liquid crystals in LCD, which is called as a "rubbing process," comprises applying a thermal resistant polymer such as a polyimide on a transparent glass to form a polymer alignment layer and rubbing the alignment layer with a rapidly rotating roller wound with a rubbing cloth made of nylon or rayon to impart an orientation.

However, the rubbing process leaves mechanical scratches on a surface of a liquid crystal alignment agent or generates such a large amount of electrostatic charges that it can destruct a thin film transistor. Also, fine fibers derived from a rubbing cloth can cause a defect and are hampering an improvement in production yield.

In a bid to overcome these problems associated with the rubbing process and to make innovation in terms of productivity, a newly designed manner of orienting liquid crystals is a UV-induced (i.e., light-induced) alignment of liquid crystals (hereinafter, referred to as "photoalignment").

Photoalignment refers to a mechanism for forming a photo-polymerizable liquid crystal alignment layer wherein pre-polarized UV rays induce a photoreaction in a photosensitivy group of a polymer, and via this process the main chains of the polymers are aligned in such a direction that liquid crystals are oriented.

Representative examples for photoalignment are the photoalignment through photopolymerization disclosed in Jpn. J. Appl. Phys., Vol. 31, 1992, 2155 by M. Schadt et al., U.S. Pat. No. 5,464,669 by Dae S. Kang et al., and Jpn. J. Appl. Phys., Vol. 34, 1995, L1000 by Yuriy Reznikov.

In the literatures and the patent as above, polycinnamate polymers such as poly(vinyl cinnamate) (PVCN) and poly (vinyl methoxycinnamate) (PVMC) were mainly used as a photoalignment polymer. In photo-aligning such a polymer, UV irradiation makes a double bond in cinnamate group go through a [2+2] cycloaddition reaction to form a cyclobutane and thereby generates anisotropy, which allows liquid crystal molecules to be aligned in one direction and leads to an orientation of liquid crystals.

With regard to conventional photoalignment polymers, Japanese Patent Laid-open Publication No. Hei11-181127 teaches a method of producing a polymer alignment layer and an alignment layer produced thereby in which main chains of polyacrylate or polymethacrylate has side chains including photoreactive groups such as cinnamate group. However, in this case, the polymer main chain has a poor thermal stability so that it has a negative impact on the stability of the alignment layer. Also, it is not easy to control a photoreaction rate via cinnamate substituent groups.

Korean Patent Laid-open Publication No. 2002-006819 discloses a method of utilizing a photoalignment layer made of polymethacrylate polymers, but the disclosed polymer has drawbacks such as a low surface hardness and a poor adhesion property.

Such a problem can be dealt with by combining a polymer having a photoreactive group with binder monomers such as acrylates or epoxy and hardening the resulting coating. In this case, an alignment layer with a higher hardness can be prepared through a light-induced reaction. However, this approach ultimately results in a lower concentration of photoreactive groups affecting the orientation of liquid crystals and thus can lead to deterioration of the orientation.

DETAILED DESCRIPTION OF THE INVENTION

Technical Objectives

To solve these problems, an objective of the present invention is to provide a polymer that can improve orientation capabilities of an alignment layer by altering a substituent group of a photoreactive functional group and thereby making a change in the composition of the photoalignment layer.

Technical Solution

The present invention provides a photoreactive norbornene polymer including a norbornene monomer represented by Chemical Formula (1) as follows:

(1)

in Chemical Formula (1),
p is an integer from 0 to 4; and
at least one of $R_1$, $R_2$, $R_3$, and $R_4$ is a radical selected from the group consisting of a group represented by Chemical Formula (1a) and a group represented by Chemical Formula (1b); and the rest of them are the same or different from each other and are independently selected from the group consisting of hydrogen; a halogen; a linear or branched C1-C20 alkyl group which is unsubstituted or substituted with one or more substituent group selected from a halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; a linear or branched C2-C20 alkenyl group which is unsubstituted or substituted with one or more substituent group selected from a halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; a linear or branched C2-C20 alkynyl group which is unsubstituted or substituted with one or more substituent group selected from a halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; C3-C12 cycloalkyl group which is unsubstituted or substituted with one or more substituent group selected from a halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; C6-C40 aryl group which is unsubstituted or substituted with one or more substituent group selected from a halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; and a polar group comprising at least one of oxygen, nitrogen, phosphorous, sulfur, silicon and boron; and when none of $R_1$, $R_2$, $R_3$, and $R_4$ is hydrogen, the halogen, or the polar group, both of $R_1$ and $R_2$ or both of $R_3$ and $R_4$ can be linked to each other to form C1-C10 alkylidene group, or $R_1$ or $R_2$ can be linked to one of $R_3$ and $R_4$ to form a saturated or unsaturated C4-C12 aliphatic ring or C6-C24 aromatic ring; and in Chemical Formulae (1a) and (1b), A is a direct bond, —O—, —S—, or —NH—; and B is selected from the group consisting of a direct bond, a substituted or unsubstituted C1-C20 alkylene, carbonyl, carboxy, ester, a substituted or unsubstituted C6-C40 arylene, and a substituted or unsubstituted C6-C40 heteroarylene; and X is —O— or —S—; and $R_9$ is selected from the group consisting of a direct bond, a substituted or unsubstituted C1-C20 alkylene, a substituted or unsubstituted C2-C20 alkenylene, a substituted or unsubstituted C3-C12 cycloalkylene, a substituted or unsubstituted C6-C40 arylene, a substituted or unsubstituted C7-C15 arylalkylene, and a substituted or unsubstituted C2-C20 alkynylene; and at least one of $R_{10}$, $R_{11}$, $R_{12}$, $R_{13}$, and $R_{14}$ is a halogen or a C1-C20 alkyl substituted with a halogen; and the rest of them are the same or different from each other and are independently selected from the group consisting of a substituted or unsubstituted C1-C20 alkyl, a substituted or unsubstituted C1-C20 alkoxy, a substituted or unsubstituted C6-C30 aryloxy, a substituted or unsubstituted C6-C40 aryl, C6-C40 heteroaryl including a heteroatom of Group 14, Group 15, or Group 16, and a substituted or unsubstituted C6-C40 alkoxyaryl.

Also, the present invention provides a process for preparing a photoreactive norbornene polymer which comprises polymerizing a norbornene monomer represented by Chemical Formula (1) at a temperature of 10-200° C. in the presence of a catalyst composition including a procatalyst which contains a Group 10 transition metal and a cocatalyst.

Also, the present invention provides an alignment layer comprising the photoreactive norbornene polymer.

Also, the present invention provides an alignment film comprising the photoreactive norbornene polymer.

Advantageous Effect of the Invention

Since the photoreactive norbornene polymer of the present invention includes a halogen substituent group, it is more exposed to the surface than other additives when being utilized to prepare an alignment layer and thus can achieve a higher orientation rate, an improved orientation, and a better adhesion property.

MODE FOR PRACTICING THE INVENTION

Hereinafter, the present invention will be explained in more detail.

Figure 1:
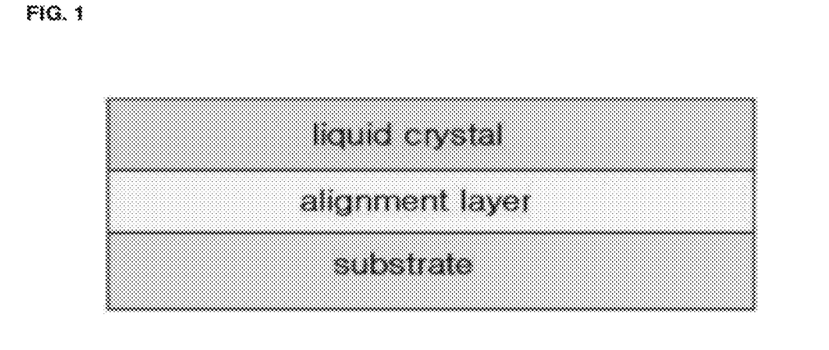
FIG. 1 is a view showing a structure of an alignment layer according to the present invention.
Figure 2:
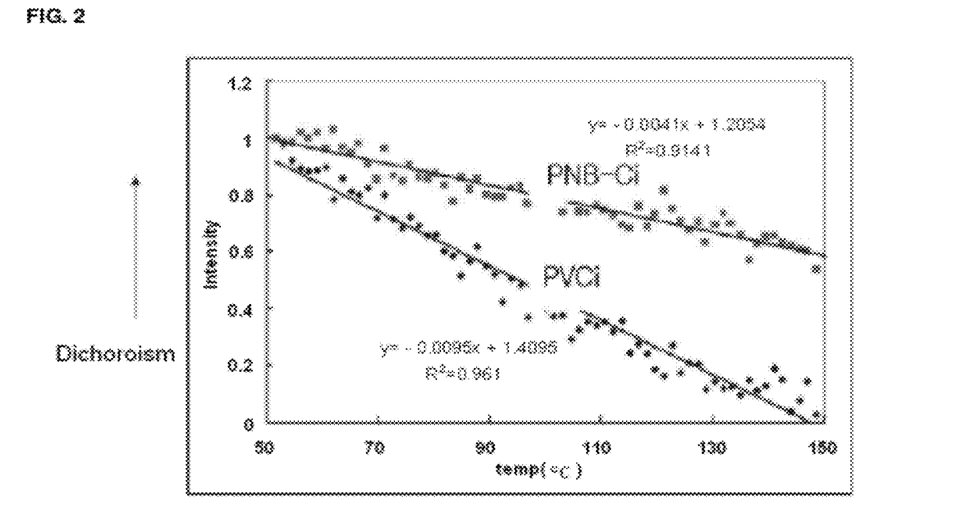
FIG. 2 is a view illustrating a comparison of the photoreactive norbornene polymer according to an embodiment of the present invention with a conventional poly(vinyl cinnamate) in terms of a thermal stability.

The photoreactive norbornene polymer according to the present invention is characterized by comprising a norbornene monomer represented by Chemical Formula (1) as above. The photoreactive norbornene polymer according to the present invention is structurally so robust and has such a high Tg (>300° C.) that it is superior to any known photoreactive polymer using acrylate polymers in a thermal stability. (see FIG. 2)

The photoreactive norbornene polymer according to the present invention includes a norbornene monomer containing a certain photoreactive functional group and thereby has a halogen substituent group inserted therein. As a result of this, it is possible to improve a photoreactivity by a UV irradiation and an adhesion property.

Specifically, the photoreactive norbornene polymer of the present invention includes a norbornene monomer in which a photoreactive cinnamate group is covalently bonded with norbornene. By inserting a halogen substituent group into the photoreactive group, an alignment layer comprising the photoreactive norbornene polymer gives a "compositional gradient" in the alignment layer and thus it can improve capabilities to orient liquid crystals. The term "compositional gradient" in the alignment layer refers to a phenomenon in which after a binder and an alignment layer polymer that forms the alignment layer are coated onto a substrate, the binder is present in large quantities nearer to the substrate while the alignment layer material is present in large quantities further from the substrate; or vice versa. In the present invention, the photoreactive material with a halogen substituent group more strongly causes this compositional gradient phenomenon with respect to the substrate as compared to other substituent groups. In particular, when the photoreactive material is substituted with fluorine, the compositional gradient depending on the substrate occurs more severely due to the uniquely low polarity. For example, if the substrate has a high polarity, a repulsive power makes the binder exist more abundantly near the substrate and the photoreactive material exist more abundantly near the surface, i.e. where it meets with liquid crystals. The more the alignment material exists where it meets with liquid crystals, the better orientation of liquid crystals can be obtained.

In the photoreactive norbornene polymer according to the present invention, the norbornene monomer represented by Chemical Formula (1) can be explained in more detail as follows.

Specifically, the polar group in Chemical Formula (1) is $-R_5OR_6$, $-OR_6$, $-OC(O)OR_6$, $-R_5OC(O)OR_6$, $-C(O)OR_6$, $-R_5C(O)OR_6$, $-C(O)R_6$, $-R_5C(O)R_6$, $-OC(O)R_6$, $-R_5OC(O)R_6$, $-(R_5O)_m-OR_6$, $-(OR_5)_m-OR_6$, $-C(O)-O-C(O)R_6$, $-R_5C(O)-O-C(O)R_6$, $-SR_6$, $-R_5SR_6$, $-SSR_6$, $-R_5SSR_6$, $-S(=O)R_6$, $-R_5S(=O)R_6$, $-R_5C(=S)R_6-$, $-R_5C(=S)SR_6$, $-R_5SO_3R_6$, $-SO_3R_6$, $-R_5N=C=S$, $-N=C=S$, $-NCO$, $-R_5-NCO$, $-CN$, $-R_5CN$, $-NNC(=S)R_6$, $-R_5NNC(=S)R_6$, $-NO_2$, $-R_5NO_2$, in the polar groups, $R_5$ is the same or different from each other and is independently a linear or branched C1-C20 alkylene which is unsubstituted or substituted with one or more substituent group selected from a halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; a linear or branched C2-C20 alkenylene which is unsubstituted or substituted with one or more substituent group selected from a halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; a linear or branched C2-C20 alkynylene which is unsubstituted or substituted with one or more substituent group selected from a halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; a C3-C12 cycloalkylene which is unsubstituted or substituted with one or more substituent group selected from a halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; C6-C40 arylene which is unsubstituted or substituted with one or more substituent group selected from a halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; C1-C20 alkoxylene which is unsubstituted or substituted with one or more substituent group selected from a halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; or C1-C20 carbonyloxylene which is unsubstituted or substituted with one or more substituent group selected from a halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; and

$R_6$, $R_7$ and $R_8$ are the same or different from each other and is independently hydrogen; a halogen; a linear or branched C1-C20 alkyl which is unsubstituted or substituted with one or more substituent group selected from a halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; a linear or branched C2-C20 alkenyl which is unsubstituted or substituted with one or more substituent group selected from a halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; a linear or branched C2-C20 alkynyl which is unsubstituted or substituted with one or more substituent group selected from a halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; a C3-C12 cycloalkyl which is unsubstituted or substituted with one or more substituent group selected from a halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; C6-C40 aryl which is unsubstituted or substituted with one or more substituent group selected from a halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; C1-C20 alkoxy which is unsubstituted or substituted with one or more substituent group selected from a halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; or C1-C20 carbonyloxy which is unsubstituted or substituted with one or more substituent group selected from a halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; and m is independently an integer from 1 to 10.

In the photoreactive norbornene polymer according to the present invention, the halogen in Chemical Formulae (1a) and (1b) comprises F, Cl, Br and I, and is more preferably F, but it is not limited thereto.

In the photoreactive norbornene polymer according to the present invention, it is more preferable that $R_1$ in Chemical Formula (1) is represented by Chemical Formula (1a) and at least one of $R_{10}$, $R_{11}$, $R_{12}$, $R_{13}$, and $R_{14}$ is F or C1-C20 alkyl substituted with F.

The photoreactive norbornene polymer of the present invention can include a repeating unit represented by Chemical Formula (2) as follows:

(2)

in Chemical Formula (2), n is 50 to 5,000 and p, $R_1$, $R_2$, $R_3$, and $R_4$ are the same as defined above.

Definition of the substituents described above will now be described in detail.

The term "alkyl" refers to a straight or branched chain, monovalent, saturated hydrocarbon with 1 to 20 carbon atoms, preferably 1 to 10 carbon atoms, and more preferably 1 to 6 carbon atoms. The alkyl group can be substituted with one or more halogen. Examples of the alkyl group include methyl, ethyl, propyl, 2-propyl, n-butyl, iso-butyl, tert-butyl, pentyl, hexyl, dodecyl, fluoromethyl, difluoromethyl, trifluoromethyl, chloromethyl, dichloromethyl, trichloromethyl, iodomethyl, bromomethyl, and the like.

The term "alkenyl" refers to a straight or branched chain, monovalent hydrocarbon including at least one C—C double bond with 2 to 20 carbon atoms, preferably 2 to 10 carbon atoms, and more preferably 2 to 6 carbon atoms. The alkenyl group can be bonded through a carbon atom including a C—C double bond or a saturated carbon atom. The alkenyl group can be substituted with one or more halogen. Examples of the alkenyl group include ethenyl, 1-prophenyl, 2-prophenyl, 2-butenyl, 3-butenyl, pentenyl, 5-hexenyl, dodecenyl, and the like.

The term "cycloalkyl" refers to a saturated or unsaturated, non-aromatic, monovalent, mono-, bi-, or tricyclic hydrocarbon with 3 to 12 cyclic carbons. The cycloalkyl group can be substituted with one or more halogen. Examples of the cycloalkyl group include cyclopropyl, cyclobutyl, cyclopentyl, cyclopentenyl, cyclohexyl, cyclohexenyl, cycloheptyl, cyclooctyl, decahydronaphtalenyl, adamantly, norbonyl (i.e. bicyclo[2.2.1]hept-5-enyl), and the like.

The term "aryl" refers to a monovalent, mono-, bi-, or tricyclic, aromatic hydrocarbon with 6 to 20 cyclic atoms and preferably 6 to 12 cyclic atoms. The aryl group can be substituted with one or more halogen. Examples of the aryl group include phenyl, naphthalenyl, fluorenyl, and the like.

The "alkoxyaryl" refers to a group in which one or more hydrogen atom in the aryl as defined above is substituted with an alkoxy group. Examples of the alkoxyaryl group include methoxyphenyl, ethoxyphenyl, propoxyphenyl, butoxyphenyl, pentoxyphenyl, hexoxyphenyl, heptoxyphenyl, octoxyphenyl, nanoxyphenyl, methoxybiphenyl, ethoxybiphenyl, propoxybiphenyl, methoxynaphthalenyl, ethoxynaphthalenyl, propoxynaphthalenyl, methoxyanthracenyl, ethoxyantracenyl, propoxyanthracenyl, methoxyfluorenyl, and the like.

The term "aralkyl" refers to a group in which at least one hydrogen atom in the alkyl group as defined above is substituted with an aryl group. The aralkyl group can be substituted with one or more halogen. Examples of the aralkyl group include benzyl, benzhydryl, trityl, and the like.

The term "alkynyl" refers to a straight or branched chain, monovalent hydrocharbon including at least one C—C triple bond with 2 to 20 carbon atoms, preferably 2 to 10 carbon atoms, and more preferably 2 to 6 carbon atoms. The alkynyl group can be bonded through a carbon atom including a C—C triple bond or a saturated carbon atom. The alkynyl group can be substituted with one or more halogen. Examples of the alkynyl group include ethynyl, propynyl, and the like.

The term "alkylene" refers to a straight or branched chain, bivalent, saturated hydrocarbon with 1 to 20 carbon atoms, preferably 1 to 10 carbon atoms, and more preferably 1 to 6 carbon atoms. The alkylene group can be substituted with one or more halogen. Examples of the alkylene group include methylene, ethylene, propylene, butylene, hexylene, and the like.

The term "alkenylene" refers to a straight or branched chain, bivalent hydrocarbon including at least one C—C double bond with 2 to 20 carbon atoms, preferably 2 to 10 carbon atoms, and more preferably 2 to 6 carbon atoms. The alkenylene group can be bonded through a carbon atom including a C—C double bond and/or a saturated carbon atom. The alkenylene group can be substituted with one or more halogen.

The term "cycloalkylene" refers to a saturated or unsaturated, non-aromatic, bivalent, mono-, bi-, or tricyclic hydrocarbon with 3 to 12 cyclic carbons. The cycloalkylene group can be substituted with one or more halogen. Examples of the cycloalkylene include cyclopropylene, cyclobutylene, and the like.

The term "arylene" refers to a bivalent, mono-, bi-, or tricyclic, aromatic hydrocarbon with 6 to 20 cyclic atoms and preferably 6 to 12 cyclic atoms. The arylene group can be substituted with one or more halogen. The aromatic portion of the arylene group includes carbon atoms only. Examples of the arylene group include phenylene and the like.

The term "arylalkylene" refers to a bivalent part in which at least one hydrogen atom of the alkylene group as defined above is substituted with an aryl group, and it can be substituted with one or more halogen. Examples of the arylalkylene group include benzylene and the like.

The term "alkynylene" refers to a straight or branched chain, bivalent hydrocarbon including at least one C—C triple bond with 2 to 20 carbon atoms, preferably 2 to 10 carbon atoms, and more preferably 2 to 6 carbon atoms. The alkynylene group may be bonded through a carbon atom including a C—C triple bond or a saturated carbon atom. The alkynylene group can be substituted with one or more halogen. Examples of the alkynylene group include ethynylene, propynylene, and the like.

The weight average molecular weight of the photoreactive norbornene polymer according to the present invention is preferably 10,000 to 1,000,000 but it is not limited thereto.

The photoreactive norbornene polymer of the present invention can be prepared by polymerizing the norbornene monomoer represented by Chemical Formula (1) at a temperature of 10-200° C. in the presence of a catalyst composition including a procatalyst containing a Group 10 transition metal and a cocatalyst.

In the process for preparing the photoreactive norbornene polymer according to the present invention, a reaction temperature lower than 10° C. is undesirable since it can lead to a significant decrease in the polymerization activity. A reaction temperature higher than 200° C. is also undesirable since it can cause decomposition of the catalyst.

In the process for preparing the photoreactive norbornene polymer according to the present invention, as the procatalyst containing a Group 10 transition metal, one can use a compound with a Lewis base functional group which can readily take part in a Lewis acid-base reaction to separate out from a center transition metal in order that the procatalyst can be easily divided by the cocatalyst providing a Lewis acid so that the center transition metal is transformed into a catalyst active species. Examples of the procatalyst includes Allylpalladium chloride dimer ([(Allyl)Pd(Cl)]$_2$), Palladium(II)acetate ((CH$_3$CO$_2$)$_2$Pd), Palladium(II)acetylacetonate ([CH$_3$COCH=C(O$^-$)CH$_3$]$_2$Pd), NiBr(NP(CH$_3$)$_3$)$_4$, [PdCl(NB)O(CH$_3$)]$_2$, and the like.

In the process for preparing the photoreactive norbornene polymer according to the present invention, the cocatalyst can be at least one selected from the group consisting of: a first cocatalyst which provides a Lewis base capable of forming a weak coordinate bond with the metal of the procatalyst; and a second cocatalyst which provides a compound comprising a neutral Group 15 electron donor ligand.

As the first cocatalyst providing a Lewis base that can form a weak coordinate bond with the metal in the procatalyst, one can use a compound easily reacting with a Lewis base to make a vacant site in a transition metal and also forming a weak coordinate bond with a transition metal compound to stabilize the generated transition metal, or a compound providing such a compound. Examples for the first cocatalyst include boranes such as B(C$_6$F$_5$)$_3$, borates such as dimethylanilinium tetrakis(pentafluorophenyl) borate, alkyl aluminums such as methylaluminoxane (MAO) or Al(C$_2$H$_5$)$_3$, and transition metal halides such as AgSbF$_6$.

Examples for the second cocatalyst providing a compound that includes a neutral Group 15 electron donor ligand include alkyl phosphine, cycloalkyl phosphine, phenyl phosphine, and the like.

In the process for preparing the photoreactive norbornene polymer of the present invention, it is preferable that the catalyst composition comprises 1 to 1,000 mole of the first cocatalyst and 1 to 1,000 mole of the second cocatalyst with respect to 1 mole of the procatalyst. If the content of the first and the second cocatalyst is less than 1 mole, the catalyst activation may not occur. If the content of the first and the second cocatalyst is more than 1,000 moles, the level of the catalyst activation can be lowered.

Also, one can render the first cocatalyst and the second cocatalyst into one salt and use it to activate the catalyst. For example, a compound prepared by combining an alkyl phosphine with a borane to form an ionic bond therebetween can be used.

Further, the present invention provides an alignment layer comprising the photoreactive norbornene polymer.

Further, the present invention provides an alignment film comprising the photoreactive norbornene polymer.

The alignment layer and the alignment film can be manufactured by using any components and methods known in the art, except for comprising the photoreactive norbornene polymer of the present invention.

By way of examples, the alignment layer and the alignment film can be prepared by mixing the photoreactive norbornene polymer with a binder resin and a photoinitiator, dissolving them in an organic solvent, and then coating it onto a substrate and UV-curing it.

Acrylates can be used as the binder resin, and more specifically, pentaerythritol triacrylate, dipentaerythritol hexaacrylate, trimethylolpropane triacrylate, tris(2-acryloyloxyethyl) isocyanurate can be exemplified.

Examples for the photoinitiator includes Irgacure 907, Irgacure 819, and the like.

Examples of the organic solvent include toluene, anisole, chlorobenzene, dichloroethane, cyclohexane, cyclopentane, propylene glycol methyl ether acetate, and the like.

In mixing the photoreactive norbornene polymer, the binder resin, and the photoinitiator and dissolving them in the organic solvent, the solid content of the solution properly ranges from 1 to 15%, and is preferably from 10 to 15% for casting it as a film and from 1 to 5% for preparing it as a thin film.

Examples of the substrate include a substrate comprising a cyclic polymer, a substrate comprising an acrylic polymer, a substrate comprising a cellulose polymer, and the like. As a coating method, one can use a bar coating, spin coating, blade coating, and the like.

Hereinafter, the present invention will be explained in further detail with reference to the following examples, however it should be understood that these examples are merely illustrative of the present invention and they are not intended to limit the scope of the present invention.

EXAMPLE

Preparation Example 1

Synthesis of 4-fluoro-cinnamic acid 10 g (80.6 mmol) of 4-fluoro-benzaldehyde, 29.5 g (2 eq.) of malonic acid, and 1.21 g (0.1 eq.) of piperidine were added to 33.7 g (3 eq.) of pyridine and stirred at room temperature for about 1 hour. After heating it to 80° C., the mixture was stirred for 12 hours. After the reaction, the resulting solution cooled down to room temperature and was slowly added with 1M HCl until it was titrated to about pH 4. The resulting powder was filtered and washed with water, and then dried in a vacuum oven. (Yield: 90%)

$^1$H-NMR (CDCl$_3$, ppm) 6.42 (d, 1H) 7.44 (d, 2H) 7.75 (d, 2H) 7.80 (d, 1H).

Preparation Example 2

Synthesis of 3-fluoro-cinnamic acid 5 g (40.1 mmol) of 3-fluoro benzaldehyde, 8.38 g (2 eq.) of malonic acid, and 0.34 g (0.1 eq.) of piperidine were added to 9.52 g (3 eq.) of pyridine and stirred at room temperature for about 1 hour. After heating it to 80° C., the mixture was stirred for 12 hours. After the reaction, the resulting solution cooled to room temperature and was slowly added with 1M HCl until it was titrated to about pH 4. The resulting powder was filtered and washed with water, and then dried in a vacuum oven. (Yield: 84%)

$^1$H-NMR (CDCl$_3$, ppm): 6.43 (d, 1H) 7.12-7.41 (m, 4H) 7.75 (d, 1H).

Preparation Example 3

Synthesis of 3,4-di-fluoro-cinnamic acid 10 g (70.4 mmol) of 3,4-di-fluoro-benzaldehyde, 14.65 g (2 eq.) of malonic acid, and 0.59 g (0.1 eq.) of piperidine were added to 16.7 g (3 eq.) of pyridine and stirred at room temperature for about 1 hour. After heating it to 80° C., the mixture was stirred for 12 hours. After the reaction, the resulting solution cooled down to room temperature and was slowly added with 1M HCl until it was titrated to about pH 4. The resulting powder was filtered and washed with water, and then dried in a vacuum oven. (Yield: 95%)

$^1$H-NMR (CDCl$_3$, ppm): 6.41 (d, 1H) 7.15-7.45 (m, 3H) 7.68 (d, 1H).

Preparation Example 4

Synthesis of Pentafluoro-Cinnamic Acid 20 g (42 mmol) of pentafluoro-benzaldehyde, 21.23 g (2 eq.) of malonic acid, and 0.85 g (0.1 eq.) of piperidine were added to 24 g (3 eq.) of pyridine and stirred at room temperature for about 1 hour. After heating it to 80° C., the mixture was stirred for 12 hours. After the reaction, the resulting solution was cooled down to room temperature and was slowly added with 1M HCl until it was titrated to about pH 4. The resulting powder was filtered and washed with water, and then dried in a vacuum oven. (Yield: 13%)

$^1$H-NMR (CDCl$_3$, ppm): 6.76 (d, 1H) 7.80 (d, 1H)

Preparation Example 5

Synthesis of 5-norbornene-2-methanol 132 g (1 mol) of dicyclopentadiene and 116.2 g (2 mol) of allyl alcohol were placed into a 300 ml high-pressure reactor and stirred at 190° C. for 3 to 4 hours. The resulting solution was distilled at 80° C. under vacuum to give 5-norbornene-2-methanol. (Yield: 67%, 166 g)

$^1$H-NMR (CDCl$_3$, ppm) 0.5 (dd, 1H) 1.1 (m, 1H) 1.2~1.45 (m, 2H) 1.58~1.8 (m, 1H) 2.31 (b, 1H) 2.76~2.92 (m, 2H) 3.25~4.6 (m, 2H) 5.96~6.17 (m, 2H)

Preparation Example 6

Synthesis of 5-norbornene-2-ol 132 g (1 mol) of dicyclopentadiene and 172.2 g (2 mol) of vinyl acetate were placed into a 300 ml high-pressure reactor and stirred at 190° C. for 3 to 4 hours. The resulting solution was distilled at 80° C. under vacuum to give 5-norbornene-2-acetate. (Yield: 61%, 186 g)

100 g of 5-norbornene-2-acetate and 2 eq. of NaOMe were dissolved in 300 ml of MC and then refluxed for 5 hours. After the extraction by water, the resulting product was acidified with 1M HCl to pH 2-3 and then 5-norbornene-2-ol of was extracted by using EA. (Yield: 80%, 72 g)

$^1$H-NMR (CDCl$_3$, ppm) 0.5 (dd, 1H) 1.15~1.56 (m, 3H) 2.28 (b, 1H) 2.66~2.38 (m, 2H) 4.1~4.32 (m, 1H) 5.88~6.32 (m, 2H)

Example 1

Synthesis of 5-norbornene-2-methyl-(4-fluoro-cinnamate)

10 g (60 mmol) of 4-fluoro-cinnamic acid, 7.45 g (60 mmol) of 5-norbornene-2-methanol, and 0.3 g (0.02 eq.) of zirconium(IV) acetate hydroxide were added to 50 ml of toluene and stirred. The mixture was heated to 145° C. under N$_2$ atmosphere and azeotropically refluxed for 24 hours. After the reaction, the mixture cooled down to room temperature and was added with 100 volume % of ethyl acetate. The resulting product was extracted with 1M HCl and washed again with water. The organic layer was dried with Na$_2$SO$_4$ and the solvent was evaporated out to give a highly viscous material. (Yield: 68%, Purity (GC): 92%)

Example 2

Synthesis of 5-norbornene-2-methyl-(3-fluoro-cinnamate)

5 g (43 mmol) of 3-fluoro-cinnamic acid, 5.35 g (43 mmol) of 5-norbornene-2-methanol, and 0.21 g (0.02 eq.) of zirconium(IV) acetate hydroxide were added to 50 ml of toluene and stirred. The mixture was heated to 145° C. under N$_2$ atmosphere and azeotropically refluxed for 24 hours. After the reaction, the mixture cooled down to room temperature and was added with 100 volume % of ethyl acetate. The resulting product was extracted by 1M HCl and washed again with water. The organic layer was dried with Na$_2$SO$_4$ and the solvent was evaporated out to give a highly viscous material. (Yield: 54%, Purity (GC): 73%)

Example 3

Synthesis of 5-norbornene-2-methyl-(3,4-di-fluoro-cinnamate)

5 g (27.2 mmol) of 3,4-di-fluoro-cinnamic acid, 3.38 g (1 eq.) of 5-norbornene-2-methanol, and 0.13 g (0.02 eq.) of zirconium(IV) acetate hydroxide were added to 50 ml of xylene and stirred. The mixture was heated to 145° C. under N$_2$ atmosphere and azeotropically refluxed for 24 hours. After the reaction, the mixture cooled down to room temperature and was added with 100 volume % of ethyl acetate. The resulting product was extracted by 1M HCl and washed again with water. The organic layer was dried with Na$_2$SO$_4$ and the solvent was evaporated out to give a highly viscous material. (Yield: 63%, Purity (GC): 80%)

Example 4

Synthesis of 5-norbornene-2-methyl-(perfluoro-cinnamate)

10 g (42 mmol) of pentafluoro-cinnamic acid, 5.7 g (*1 eq.) of 5-norbornene-2-methanol and 0.2 g (0.02 eq.) of zirconium (IV) acetate hydroxide were added to 50 ml of xylene and stirred. The mixture was heated to 145° C. under N$_2$ atmosphere and azeotropically refluxed for 24 hours. After the reaction, the mixture cooled down to room temperature and was added with 100 volume % of ethyl acetate. The resulting product was extracted by 1M HCl and washed again with water. The organic layer was dried with Na$_2$SO$_4$ and the solvent was evaporated out to give a highly viscous material. (Yield: 32%, Purity (GC): 85%)

Example 5

Synthesis of 5-norbornene-2-(4-fluoro-cinnamate)

10 g (60 mmol) of 4-fluoro-cinnamic acid, 6.6 g (60 mmol) of 5-norbornene-2-ol, and 0.3 g (0.02 eq.) of zirconium(IV) acetate hydroxide were added to 50 ml of toluene and stirred. The mixture was heated to 145° C. under N$_2$ atmosphere and azeotropically refluxed for 24 hours. After the reaction, the mixture cooled down to room temperature and was added with 100 volume % of ethyl acetate. The resulting product was extracted by 1M HCl and washed again with water. The organic layer was dried with Na$_2$SO$_4$ and the solvent was evaporated out to give a highly viscous material. (Yield: 72%, Purity (GC): 95%)

Example 6

Polymerization of 5-norbornene-2-methyl-(4-fluoro-cinnamate)

After 5 g (18.4 mmol) of 5-norbornene-2-methyl-(4-fluoro-cinnamate) was dissolved in 15 ml of toluene, the solution was stirred for 30 minutes while purging it with N$_2$. The solution was heated to 90° C., added with 4.13 mg (18.4 µmol) of Pd(acetate)$_2$ and 37.2 mg (38.6 µmol) of tris(cyclohexyl)hydrogen phosphino tetrakis(pentafluorobenz)borate that were dissolved in 1 ml of methylene chloride, and then stirred at 90° C. for 15 hours. After the reaction, the resulting product cooled down to room temperature and was added with ethanol to give precipitates. The precipitates were filtered and dried in a vacuum oven. (Yield: 85%, Mw: 158,000 (PDI=2.88))

Example 7

Polymerization of 5-norbornene-2-methyl-(3-fluoro-cinnamate)

After 5 g (18.4 mmol) of 5-norbornene-2-methyl-(3-fluoro-cinnamate) was dissolved in 15 ml of toluene, the solution was stirred for 30 minutes while purging it with N$_2$. The solution was heated to 90° C., added with 4.1 mg (18.4 µmol) of Pd(acetate)$_2$ and 37.1 mg (38.6 µmol) of tris(cyclohexyl)hydrogen phosphino tetrakis(pentafluorobenz)borate that were dissolved in 1 ml of methylene chloride, and then stirred at 90° C. for 15 hours. After the reaction, the resulting product cooled down to room temperature and was added with ethanol to give precipitates. The precipitates were filtered and dried in a vacuum oven. (Yield: 42%, Mw: 23,000 (PDI=2.05))

Example 8

Polymerization of 5-norbornene-2-methyl-(3,4-di-fluoro-cinnamate)

After 5 g (17.2 mmol) of 5-norbornene-2-methyl-(3,4-di-fluoro-cinnamate) was dissolved in 15 ml of toluene, the solution was stirred for 30 minutes while purging it with N$_2$. The solution was heated to 90° C., added with 1.29 mg (5.7 µmol) of Pd(acetate)$_2$ and 11.5 mg (11.97 µmol) of tris(cyclohexyl)hydrogen phosphino tetrakis(pentafluorobenz)borate that were dissolved in 1 ml of methylene chloride, and then stirred at 90° C. for 15 hours. After the reaction, the resulting product cooled down to room temperature and was added with ethanol to give precipitates. The precipitates were filtered and dried in a vacuum oven. (Yield: 65%, Mw: 85,000 (PDI=2.11))

Example 9

Polymerization of 5-norbornene-2-methyl-(perfluoro-cinnamate)

After 5 g (14.3 mmol) of 5-norbornene-2-methyl-(perfluoro-cinnamate) was dissolved in 15 ml of toluene, the solution was stirred for 30 minutes while purging it with N$_2$. The solution was heated to 90° C., added with 1.07 mg (4.7 µmol) of Pd(acetate)$_2$ and 11.5 mg (11.97 µmol) of tris(cyclohexyl)hydrogen phosphino tetrakis(pentafluorobenz)borate that were dissolved in 1 ml of methylene chloride, and then stirred at 90° C. for 15 hours. After the reaction, the resulting product cooled down to room temperature and was added with ethanol to give precipitates. The precipitates were filtered and dried in a vacuum oven. (Yield: 23%, Mw: 25,000 (PDI=3.55))

Example 10

Polymerization of 5-norbornene-2-(4-fluoro-cinnamate)

After 4.75 g (18.4 mmol) of 5-norbornene-2-(4-fluoro-cinnamate) was dissolved in 15 ml of toluene, the solution was stirred for 30 minutes while purging it with N$_2$. The solution was heated to 90° C., added with 4.13 mg (18.4 µmol) of Pd(acetate)$_2$ and 37.2 mg (38.6 µmol) of tris(cyclohexyl)hydrogen phosphino tetrakis(pentafluorobenz)borate that were dissolved in 1 ml of methylene chloride, and then stirred at 90° C. for 15 hours. After the reaction, the resulting product cooled down to room temperature and was added with ethanol to give precipitates. The precipitates were filtered and dried in a vacuum oven. (Yield: 78%, Mw: 132,000 (PDI=2.13))

Experimental Example 1

In order to investigate photoreactivity and anisotropy for the photoreactive norbornene polymers obtained from Examples 6 and 7, absorbance was determined for each polymer by using a UV-visible Spectrometer. The photoreactive norbornene polymer of Example 6 or Example 7 (2 wt %), pentaerythritol triacrylate (PETA) (2 wt %) and Irgacure 819 (0.2 wt %) were dissolved in a solvent. The resulting solution was spin-coated onto a quartz plate at 4,000 rpm for 30 second, was dried at 80° C. for 2 minutes, and then irradiated with a light of 15 mw/cm$^2$ by using a UV irradiator with a polarizing plate being disposed in front of a UV lamp. Absorbances in vertical direction and in horizontal direction were determined for each sample as irradiated over time to calculate the anisotropy ((A⊥−A//)/(A⊥+A//)). The reactivity was calculated through the amount of the remaining double bond of the cinnamate group ((A⊥+A//)/2). The results are show in FIG. 3.

Experimental Example 2

In order to determine the orientation of liquid crystals for the alignment layer comprising the polymer of Example 6 or Example 7, the same solutions as described in Experimental Example 1 were prepared, bar-coated on the same substrate as described above, and then dried in a oven at 60° C. for 2 minutes. Liquid crystals that can splay were also bar coated thereto and dried at 80° C. for 2 minutes. After that, the orientation was determined with the naked eye and by using a polarized microscope. As comparative experimental examples, comparison was also made with photoalignment polymers having an alkoxy substituent group or an alkyl substituent group. The results for these experimentations are shown in Table 1 as follows.

TABLE 1

| | Polymer | Binder | Orientation[1] | Adhesion[2] |
|---|---|---|---|---|
| Experimental Example 2-1 | 3F | PETA | ○ | ○ |
| Experimental Example 2-2 | 3F | DPHA | Δ | ○ |
| Experimental Example 2-3 | 3F | Isocyanurate | Δ | ○ |
| Experimental Example 2-4 | 4F | PETA | ○ | ○ |
| Experimental Example 2-5 | 4F | DPHA | ○ | ○ |
| Experimental Example 2-6 | 4F | Isocyanurate | Δ | ○ |
| Experimental Example 2-7 | 4F(2) | PETA | ○ | ○ |
| Experimental Example 2-8 | 4F(2) | DPHA | ○ | ○ |
| Experimental Example 2-9 | 4F(2) | Isocyanurate | Δ | ○ |
| Comparative Exp. Example 2-1 | EtO | PETA | ○ | Δ |
| Comparative Exp. Example 2-2 | EtO | DPHA | X | Δ |
| Comparative Exp. Example 2-3 | EtO | Isocyanurate | X | X |
| Comparative Exp. Example 2-4 | Et | PETA | ○ | Δ |
| Comparative Exp. Example 2-5 | Et | DPHA | X | Δ |
| Comparative Exp. Example 2-6 | Et | Isocyanurate | X | X |
| Comparative Exp. Example 2-7 | PVCi | PETA | Δ | Δ |
| Comparative Exp. Example 2-8 | PVCi | DPHA | X | Δ |
| Comparative Exp. Example 2-9 | PVCi | Isocyanurate | X | X |

3F: 5-norbornene-2-methyl-(3-fluoro-cinnamate)
4F: 5-norbornene-2-methyl-(4-fluoro-cinnamate)
4F(2): 5-norbornene-2-(4-fluoro-cinnamate)
EtO: 5-norbornene-2-methyl-(4-ethoxy cinnamate)
Et: 5-norbornene-2-methyl-(4-ethyl cinnamate)
PVCi: poly(vinyl cinnamate)
PETA: pentaerythritol triacrylate
DPHA: dipentaerythritol hexaacrylate
Isocyanurate: tris(2-acrylolyloxyethyl) isocyanurate With regard to the "orientation" in Table 1, after each of the alignment layers was UV-cured with a constant intensity of the radiation, 100 mJ/cm$^2$, the orientation or the liquid crystals was evaluated in accordance with the following standards: ○=the orientation was excellent throughout the whole surface; Δ=a haze was observed; x=no orientation occurred.

Also, the "adhesion" property was evaluated by using a tape testing method in accordance with the following standards: ○=tape testing>95%; Δ=tape testing>50%.

As confirmed by the results of Table 1, polymers substituted with fluorine gave a better result in the orientation and the adhesion property than polymers with other substituent groups. Due to a substance gradient occurring in a thin layer by fluorine, the alignment layer material is more abundant near the surface and the binder is more abundant near the substrate. This gives a superior orientation and an excellent adhesion to the substrate. Also, by comparison, PVCi is inferior to norbornene in the orientation and the adhesion property. Because PVCi fails to have such a thermal, structural stability as the norbornene has, it imparts little or no orientation and also shows a poor adhesion property as no gradient in the material concentration occurs.

Experimental Example 3

A depth profile was determined with an ESCA for an alignment layer prepared by using the photoreactive norbornene polymer obtained from Example 3 in the same manner as described in Experimental Example 1. A chemical species to be identified was fluorine, and the results are shown in FIG. 4.

Figure 4:
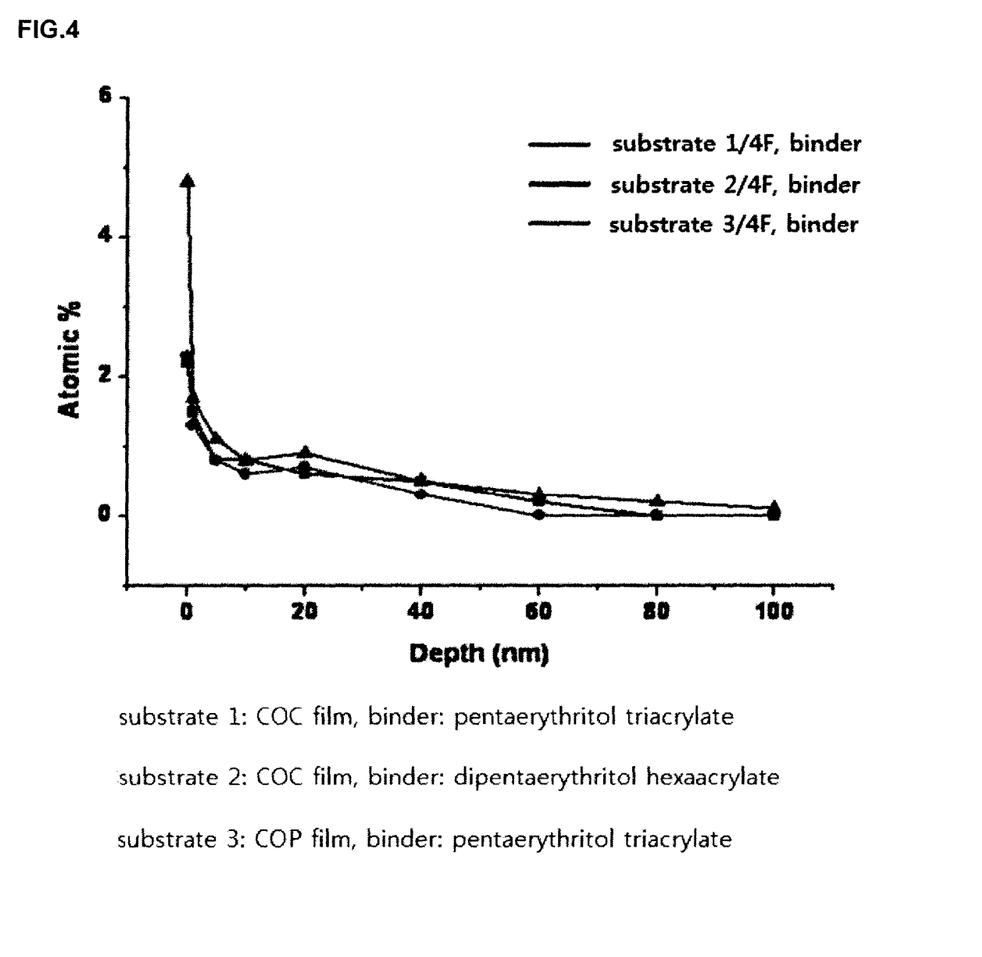
FIG. 4 is a view illustrating an ESCA result for an alignment layer in accordance with Experimental Example 3 of the present invention.

As understood from FIG. 4, for each substrate, the amount of fluorine is higher on the surface, and it gradually decreases toward the substrate.

In the alignment layer, the capability of orienting liquid crystals depends on the concentration of the alignment material on the surface of the alignment layer. When an alignment layer purely consists of an alignment material, the concentration of the alignment material is so high that the orientation capability can be improved, but the hardness of the alignment layer would be deteriorated. For that reason mixed is a binder such as acrylates, which in turn causes a decrease in the concentration of the alignment material and thus a deterioration of the orientation capability.

Figure 3:
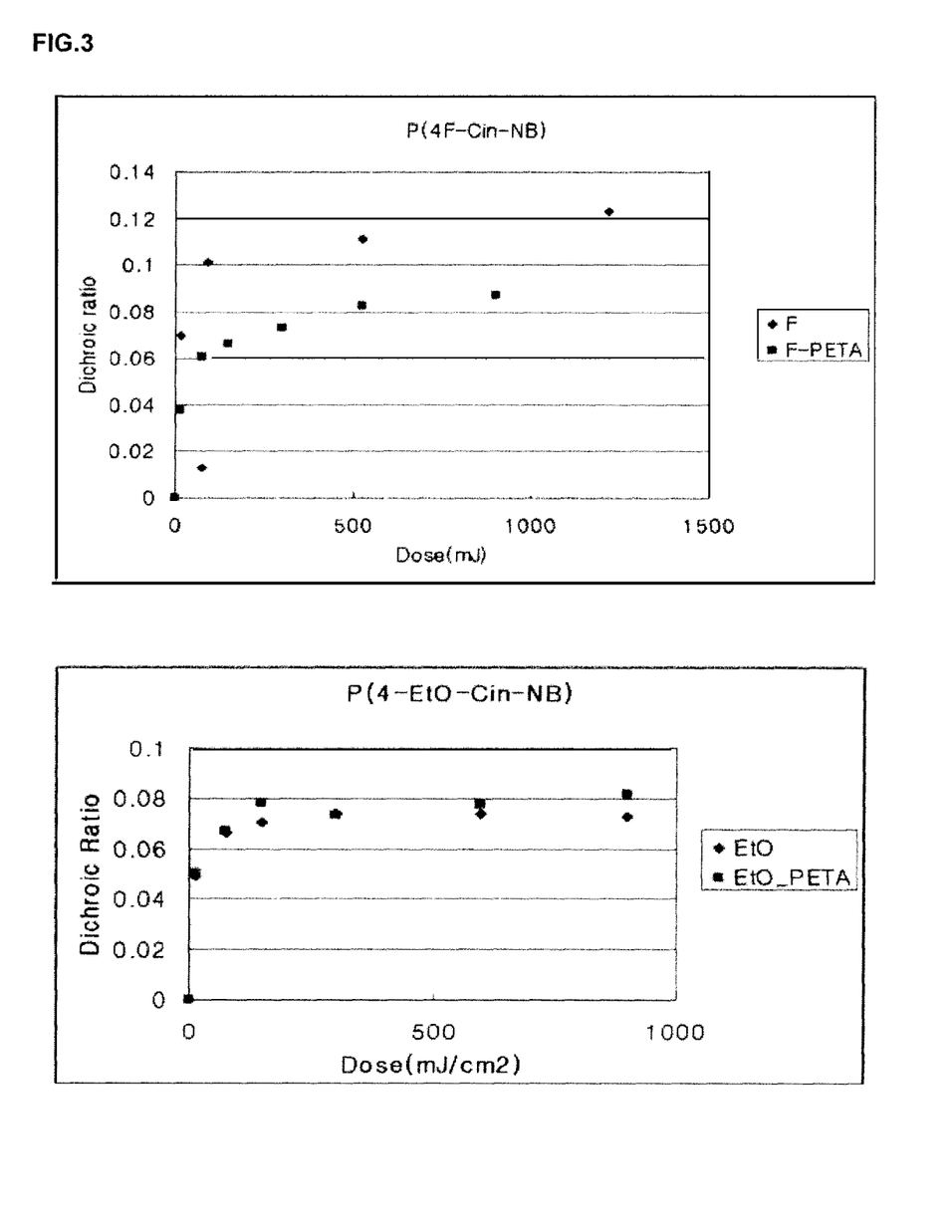
FIG. 3 is a view illustrating the anisotropy and the reactivity investigated by using UV-visible spectrometer.

From the results shown in FIG. 3, it can be understood that the alignment layers have a high anisotropy when they purely consist of the alignment material regardless of the substituent group. Also, from FIG. 3, it can be understood that when the alignment material is mixed with a binder, the alignment layers have a similar anisotropy regardless of the substituent.

As the anisotropy and the reactivity are determined by the UV-visible spectrometer, it cannot be identified how much of the alignment material exists in the vicinity of the surface of the alignment layer. When we actually oriented the liquid crystals, we found that the degree of the orientation of the liquid crystals varied depending on the type the substituent group. (see Table 1)

We presumed that this is because a gradient from the substrate to the surface occurred in the alignment materials forming the alignment layer and confirmed this presumption through an ESCA. (see FIG. 4)

In the case of fluorine, regardless of the substrate, it was distributed most on the surface and its amount gradually decreased toward the substrate, which means that the alignment material having the fluorine substituent group is most abundant on the surface. By comparison, in the methoxy and the ethoxy substituent groups, the results varied depending on the substrate and the gradient was not so large as in the fluorine substituent group. Therefore, the fluorine substituent makes the alignment materials go up toward the surface of the alignment layer and thus the alignment materials have a better orientation capability than other cinnamate alignment materials with different substituent groups.

The invention claimed is:

1. A photoreactive norbornene polymer including a norbornene monomer represented by Chemical Formula (1):

(1)

in Chemical Formula (1),
p is an integer from 0 to 4; and
at least one of $R_1$, $R_2$, $R_3$, and $R_4$ is a radical group represented by Chemical Formula (1a); and the rest of them are the same or different from each other and are independently selected from the group consisting of hydrogen; a halogen; a linear or branched C1-C20 alkyl group which is unsubstituted or substituted with one or more substituent group selected from a halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; a linear or branched C2-C20 alkenyl group which is unsubstituted or substituted with one or more substituent group selected from a halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; a linear or branched C2-C20 alkynyl group which is unsubstituted or substituted with one or more substituent group selected from a halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; C3-C12 cycloalkyl group which is unsubstituted or substituted with one or more substituent group selected from a halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; C6-C40 aryl group which is unsubstituted or substituted with one or more substituent group selected from a halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; and a polar group comprising at least one of oxygen, nitrogen, phosphorous, sulfur, silicon and boron; and when none of $R_1$, $R_2$, $R_3$, and $R_4$ is hydrogen, the halogen, or the polar group, both of $R_1$ and $R_2$ or both of $R_3$, and $R_4$ can be linked to each other to form C1-C10 alkylidene group, or $R_1$ or $R_2$ can be linked to one of $R_3$ and $R_4$ to form a saturated or unsaturated C4-C12 aliphatic ring or a C6-C24 aromatic ring; and (1a)

in Chemical Formula (1a),

A is a direct bond; —O—, —S—, or —NH—; and

B is selected from the group consisting of a direct bond, a substituted or unsubstituted C1-C20 alkylene, carbonyl, carboxy, ester, a substituted or unsubstituted C6-C40 arylene, and a substituted or unsubstituted C6-C40 heteroarylene; and

$R_9$ is selected from the group consisting of a direct bond, a substituted or unsubstituted C1-C20 alkylene, a substituted or unsubstituted C2-C20 alkenylene, a substituted or unsubstituted C3-C12 cycloalkylene, a substituted or unsubstituted C6-C40 arylene, a substituted or unsubstituted C7-C15 arylalkylene, and a substituted or unsubstituted C2-C20 alkynylene; and at least one of $R_{10}$, $R_{11}$, $R_{12}$, $R_{13}$, and $R_{14}$ is a halogen or a C1-C20 alkyl substituted with a halogen; and the rest of them are the same or different from each other and are independently selected from the group consisting of a hydrogen, a substituted or unsubstituted C1-C20 alkyl, a substituted or unsubstituted C1-C20 alkoxy, a substituted or unsubstituted C6-C30 aryloxy, a substituted or unsubstituted C6-C40 aryl, C6-C40 heteroaryl including a heteroatom of Group 14, Group 15, or Group 16, and a substituted or unsubstituted C6-C40 alkoxyaryl.

2. The photoreactive norbornene polymer according to claim 1, wherein the halogen in Chemical Formula (1a) is selected from the group consisting of F, Cl, Br, and I.

3. The photoreactive norbornene polymer according to claim 1, wherein $R_1$ of Chemical Formula (1) is represented by Chemical Formula (1a), and at least one of $R_{10}$, $R_{11}$, $R_{12}$, $R_{13}$, and $R_{14}$ of Chemical Formula (1a) is F or C1-C20 alkyl substituted with F.

4. The photoreactive norbornene polymer according to claim 1, wherein the photoreactive norbornene polymer includes a repeating unit represented by Chemical Formula (2):

(2)

in Chemical Formula (2), n is 50 to 5,000 and p, $R_1$, $R_2$, $R_3$, and $R_4$ are the same as defined in Chemical Formula (1).

5. The photoreactive norbornene polymer according to claim 1, wherein the photoreactive norbornene polymer has a weight average molecular weight ranging from 10,000 to 1,000,000.

6. A process for preparing a photoreactive norbornene polymer which comprises polymerizing a norbornene monomer represented by Chemical Formula (1) at a temperature of 10-200° C. in the presence of a catalyst composition including a procatalyst containing a Group 10 transition metal and a cocatalyst:

(1)

in Chemical Formula (1), p is an integer from 0 to 4; and at least one of $R_1$, $R_2$, $R_3$, and $R_4$ is a radical group represented by Chemical Formula (1a); and the rest of them are the same or different from each other and are independently selected from the group consisting of hydrogen; a halogen; a linear or branched C1-C20 alkyl group which is unsubstituted or substituted with one or more substituent group selected from a halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; a linear or branched C2-C20 alkenyl group which is unsubstituted or substituted with one or more substituent group selected from a halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; a linear or branched C2-C20 alkynyl group which is unsubstituted or substituted with one or more substituent group selected from a halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; C3-C12 cycloalkyl group which is unsubstituted or substituted with one or more substituent group selected from a halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; C6-C40 aryl group which is unsubstituted or substituted with one or more substituent group selected from a halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; and a polar group comprising at least one of oxygen, nitrogen, phosphorous, sulfur, silicon and boron; and when none of $R_1$, $R_2$, $R_3$, and $R_4$ is hydrogen, the halogen, or the polar group, both of $R_1$ and $R_2$ or both of $R_3$, and $R_4$ can be linked to each other to form C1-C10 alkylidene group, or $R_1$ or $R_2$ can be linked to one of $R_3$ and $R_4$ to form a saturated or unsaturated C4-C12 aliphatic ring or a C6-C24 aromatic ring; and in Chemical Formula (1a), A is a direct bond, —O—, —S—, or —NH—; and B is selected from the group consisting of a direct bond, a substituted or unsubstituted C1-C20 alkylene, carbonyl, carboxy, ester, a substituted or unsubstituted C6-C40 arylene, and a substituted or unsubstituted C6-C40 heteroarylene; and $R_9$ is selected from the group consisting of a direct bond, a substituted or unsubstituted C1-C20 alkylene, a substituted or unsubstituted C2-C20 alkenylene, a substituted or unsubstituted C3-C12 cycloalkylene, a substituted or unsubstituted C6-C40 arylene, a substituted or unsubstituted C7-C15 arylalkylene, and a substituted or unsubstituted C2-C20 alkynylene; and at least one of $R_{10}$, $R_{11}$, $R_{12}$, $R_{13}$, and $R_{14}$ is a halogen or a C1-C20 alkyl substituted with a halogen; and the rest of them are the same or different from each other and are independently selected from the group consisting of a hydrogen, a substituted or unsubstituted C1-C20 alkyl, a substituted or unsubstituted C1-C20 alkoxy, a substituted or unsubstituted C6-C30 aryloxy, a substituted or unsubstituted C6-C40 aryl, C6-C40 heteroaryl including a heteroatom of Group 14, Group 15, or Group 16, and a substituted or unsubstituted C6-C40 alkoxyaryl.

7. The process for preparing a photoreactive norbornene polymer according to claim 6, wherein the procatalyst includes at least one selected from the group consisting of Allylpalladium chloride dimer ($[(Allyl)Pd(Cl)]_2$), Palladium(II)acetate (($CH_3CO_2)_2Pd$), Palladium(II)acetylacetonate ($[CH_3COCH=C(O^-)CH_3]_2Pd$), $NiBr(NP(CH_3)_3)_4$, and $[PdCl(NB)O(CH_3)]_2$.

8. The process for preparing a photoreactive norbornene polymer according to claim 6, wherein the cocatalyst comprises at least one selected from the group consisting of a first cocatalyst which provides a Lewis base capable of forming a weak coordinate bond with the metal of the procatalyst; and a second cocatalyst which provides a compound including a neutral Group 15 electron donor ligand.

9. An alignment layer comprising the photoreactive norbornene polymer according to claim 1.

10. The alignment layer according to claim 9, wherein the alignment layer is prepared by mixing a photoreactive norbornene polymer, a binder resin, and a photoinitiator, dissolving them in an organic solvent, coating it onto a substrate and UV-curing it.

11. The alignment layer according to claim 10, wherein the binder resin comprises at least one acrylate selected from the group consisting of pentaerythritol triacrylate, dipentaerythritol hexaacrylate, trimethylolpropane triacrylate, and tris(2-acrylolyloxyethyl) isocyanurate.

* * * * *